Feb. 14, 1956 H. REID 2,734,574
WORK-HOLDING CLAMP FOR TRIMMING MACHINES
Filed May 29, 1953 2 Sheets-Sheet 1
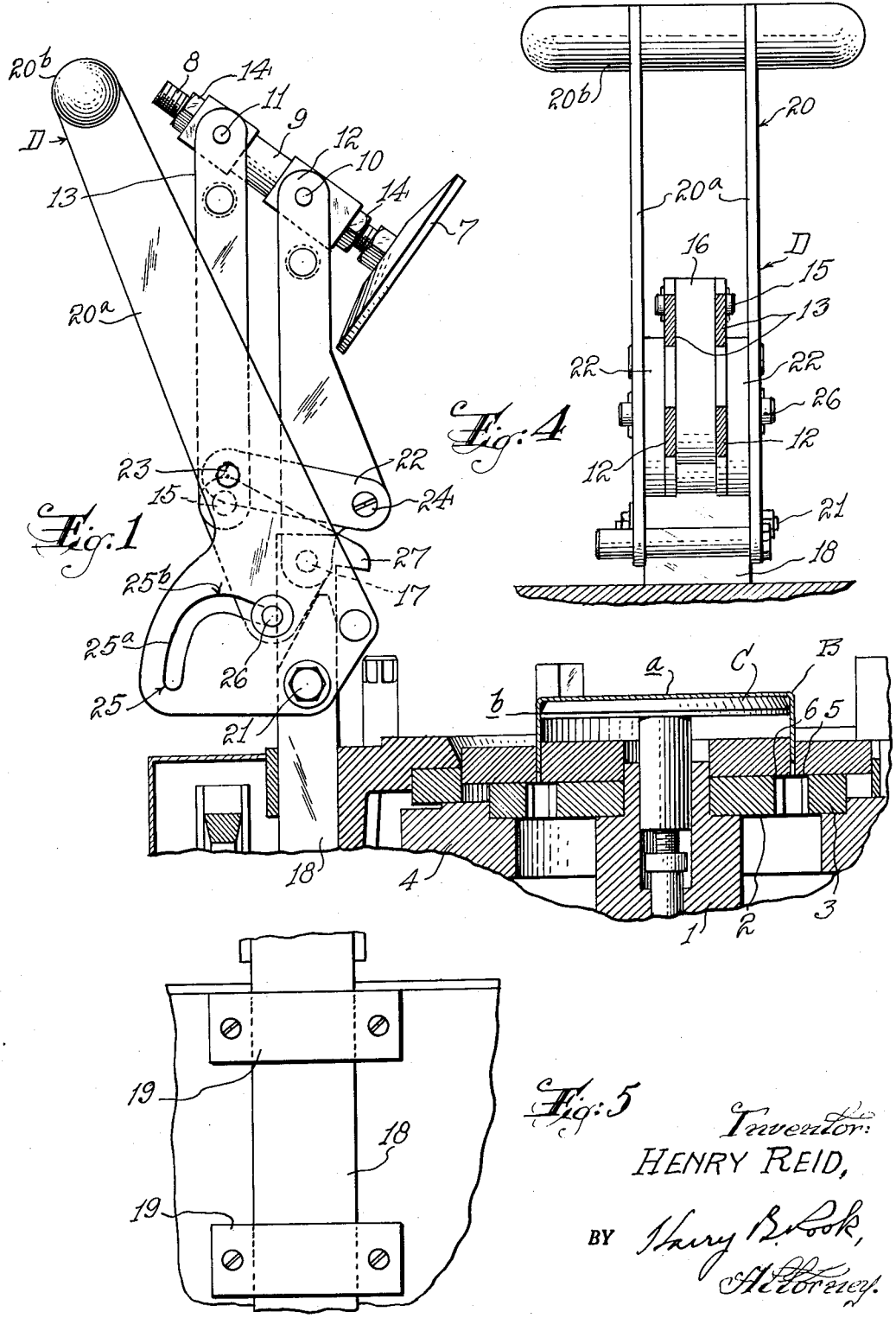

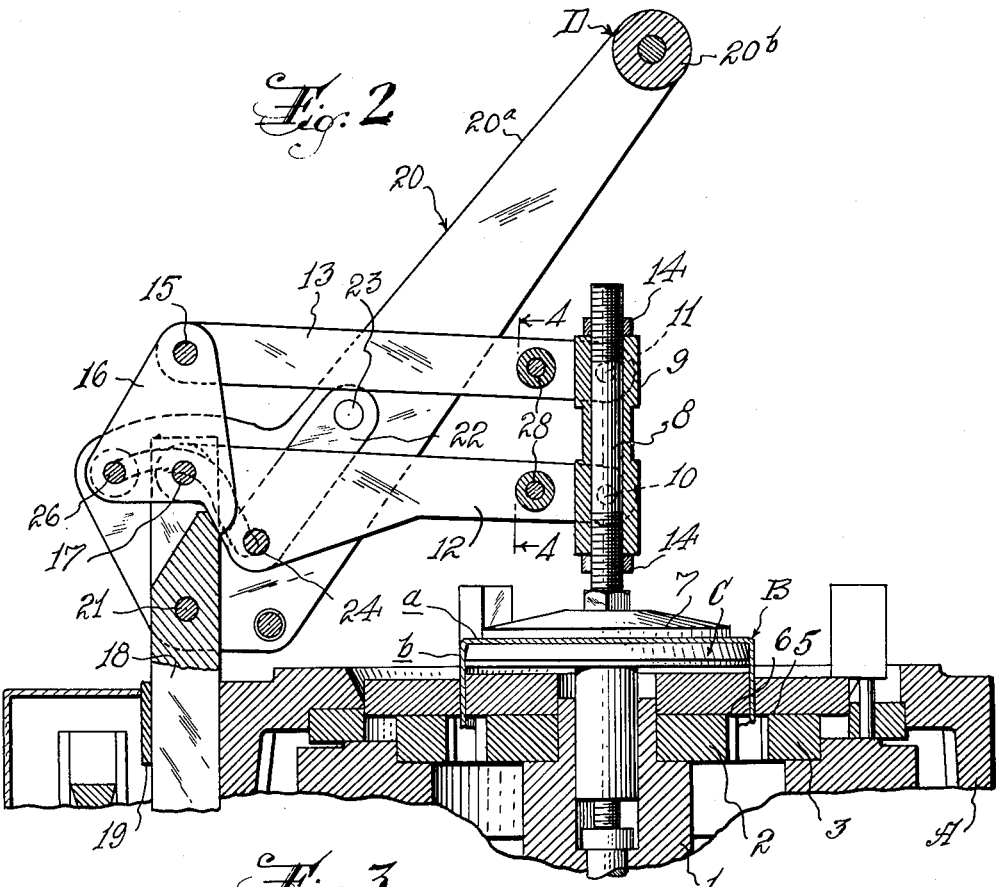
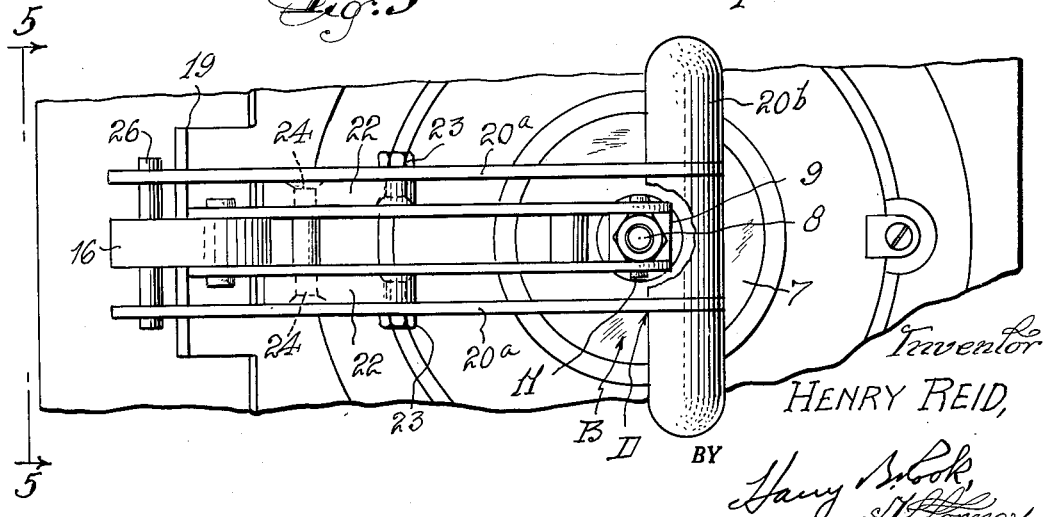

United States Patent Office 2,734,574
Patented Feb. 14, 1956

2,734,574

WORK-HOLDING CLAMP FOR TRIMMING MACHINES

Henry Reid, West Orange, N. J.

Application May 29, 1953, Serial No. 358,310

6 Claims. (Cl. 164—79)

This invention relates particularly to a machine for holding work articles such as cams, boxes and covers in proper relation to cutting dies in machines for trimming the edges and punching, notching and embossing the walls of such articles, for example, as described and claimed in my copending application, Serial No. 342,356, filed March 16, 1953, but the invention may be embodied in work-holding devices for other purposes.

In trimming machines of the character described, usually there is a plate-like support for the article or work piece disposed in a plane arranged parallel to the plane of operation of the cutting dies or other instrumentalities to operate upon the article, and a cup-shaped article is set with its bottom wall in contact with said flat support and with its perimetral flange extending toward the cutting dies, and the article is firmly clamped on the work support during the operation upon the article.

A prime object of the present invention is to provide a novel and improved clamping mechanism for holding the article with its bottom wall in exactly parallel relation to the plane of operation of the cutting dies and with the flange of the article accurately disposed with respect to the cutting dies.

Another object is to provide a work-holding clamp of this character which shall include a plate-like or disc-like head for engaging the exterior of said bottom wall of the article to clamp the article between the work support and said head, in combination with novel and improved means for mounting said head on the frame of the machine or to the fixed support so that the head will swing into exactly parallel relation to the work support to clamp the work in position to be operated upon and the head can be swung away from the work support to provide full clearance for placement and removal of the article on and from said work support, respectively.

Other objects are to provide a work holder or clamp which shall comprise a novel and improved construction and combination of such a work-engaging head, parallel links and means for mounting said links on a fixed support, and shall be simple, inexpensive, reliable and durable; and to obtain other advantages and results that will be brought out by the following description in conjunction with the accompanying drawings in which:

Figure 1 is a side elevational view of a work-holding clamp constructed in accordance with the invention and associated with a trimming machine of the type described in my aforesaid co-pending application, Serial No. 342,356, portions of which are illustrated in vertical section, the clamp being shown in position to permit placement or removal of the work on or from the work support;

Figure 2 is a central vertical sectional view through the clamp and portions of the trimming machine and showing the clamp in work holding position;

Figure 3 is a top plan view of the work-holding clamp and portions of the trimming machine as illustrated in Figure 2;

Figure 4 is a transverse vertical sectional view approximately on the plane of the line 4—4 of Figure 2;

Figure 5 is a fragmentary rear elevational view taken approximately from the plane of the line 5—5 of Fig. 3, with portions broken away and shown in section.

As above indicated for the purposes of illustrating the principles of the invention, a work-holding clamp has been shown in association with the trimming machine shown in my aforesaid co-pending application which includes a main frame A which has a post 1 approximately centrally thereof to which is affixed in any suitable manner a punch 2 and a die 3 that has a cutting edge 5 to cooperate with the cutting edge 6 of the punch upon horizontal movement of the die in its own plane. The punch and die shown are of circular shape but they may be of any desired form to suit the contour of the work piece or article B which is here shown as an inverted cup-shaped structure having a bottom wall $a$ in contact with the flat upper surface of a plate-like work support C and an annular wall $b$ extending from the work support toward the punch and die as shown in Fig. 1. The work support C is normally elevated into the position shown in Fig. 1 so as to yield downwardly during the work-clamping operation to locate the annular wall in the space between the cutting edges of the punch and die as shown in Fig. 2, all as described in the above mentioned co-pending application.

The invention provides a clamp D for accurately positioning and holding the work in exactly the proper relation to the cutting dies as shown in Fig. 2. The clamp is shown as comprising a plate-like or disc-like head 7 to engage the upper side of the bottom wall $a$ of the article B when the latter is mounted on the work support C; and the work-engaging head is shown as having a rod 8 projecting centrally and perpendicularly therefrom and longitudinally slidably mounted in a tubular guide bracket 9 which has pivotal connections 10 and 11 with the ends of two pairs of parallel links 12 and 13, respectively. The rod 8 is adjustable in the guide bracket 9 to vary the relation of the work-engaging head 7 to the work support C in accordance with the height of the work support when the latter is depressed to locate the article in position to be operated upon by the cutting edges of the punch and die, as shown in Fig. 2. Nuts 14 are shown for holding the rod in adjusted positions.

The ends of the links 13 opposite the guide bracket 9 are pivotally connected at 15 to one arm of a bell crank lever 16 which is in turn pivotally mounted at 17 on a post on standard 18 which is preferably adjustably mounted in suitable guides 19 on the frame of the machine at one side of the work support for supporting the clamp D in proper relation to the work support. The ends of the links 12 opposite the guide bracket 9 are also pivotally connected at 17 to the post 18. A main operating arm 20 is provided for swinging the links, and consequently the work-engaging head 7, into and from work-clamping position, said operating arm being pivotally connected at 21 to the post 18 and being shown with a handle 20b for manual operation. The arm has an articulated connection to the lower links 12 by motion-transmitting links 22 that have one end pivotally connected at 23 to the operating arm and the other end pivotally connected at 24 to the links 12.

As shown, the operating arm 20 comprises two parallel sections 20a that are disposed at opposite sides of the post 18 and have the bell crank 16 and the links 12 and 13 disposed between them; and one link 22 is connected to each of said sections 20a and one of the parallel links 12. Each section 20a has a cam slot 25 therein through which passes a pin 26 that is carried by the bell crank 16, and one portion 25b of each of said slots is formed to tilt the bell crank on its pivot 17 relatively to the post 18 and away from the work support as the parallel links and work engaging head are swung out of work clamping position into their normal inoperative position as shown in Fig. 1, while other portions 25a of said slots which are concentric with pivot 21 cooperate with the pin 26 to hold and steady the bell crank in vertical position and against tilting during movement of the parallel links 12 and 13 and the work engaging head into work-clamping position. This tilting of the bell crank permits the parallel links to be swung into approximately vertical position so that the work-engaging head may be swung far enough to one side of the axis of the work support to permit free and easy placement and removal of the work piece or article B on and from the work support without interference by the clamp D. Preferably a stop lug 27 is provided on the bell crank to engage the post 18 for limiting swinging of the bell crank during the work-clamping movements of the clamp.

For compactness and simplicity, the bell crank 16 is also straddled by the ends of the parallel links 12 and 13 as best shown in Fig. 3, and the parallel links may be formed of one piece with bifurcated ends if desired.

The operation of the mechanism probably will be understood from the foregoing, but for clarity it may be explained that initially and normally the parts are in the positions shown in Fig. 1 with the work support C elevated. The article B is slipped over the work support whether manually or by suitable automatic mechanism, whereupon the operating arm 20 of the clamp is swung downwardly toward the work support and the cam groove 25b acting on the pin 26 raises the bell crank 16 to its vertical position where it will be so retained by the extension 25a of the cam groove 25. From this position the work engaging head 7 of the clamp will engage the article B and due to parallel links 12 and 13, the axis of the rod 8 will be perpendicular and consequently the work engaging head will be exactly parallel to and coincident with the axis of the work support C, and the face of the work engaging head 7 will be exactly parallel to the work support C as said head reaches the end of its work-clamping movement, it being understood that the work support is forced downwardly by said work-engaging head from the position shown in Fig. 1 to the position shown in Fig. 2 before the work is finally clamped in proper relation to the punch and die. With the parts in this work-clamping position, the links 22 and their pivots 23 and 24 are so located that the pivot 24 is positioned beyond the dead center point between the pivots 21 and 23 so as to firmly lock the clamp in work-clamping position. This parallel action of the work-engaging head will prevent tilting of the article and an accurately trimmed annular flange B will be insured.

It will be observed that an important feature of the invention is means for changing the relation of the pivotal connection 15 to the pivot 17 upon movement of the work-engaging head toward and from the work support. In other words, these pivotal connections are disposed in a common plane approximately parallel to the axis of the work support C when the work engaging head is in work clamping position (Fig. 2), and said pivotal connections are moved so that their common plane is oblique to the axis of said work support at the end of the movement of work-engaging head away from the work support, as shown in Fig. 1.

It will be understood by those skilled in the art that the operating arm 20 could be power-actuated automatically, if desired.

While the invention has been shown and described as embodied in certain structural details, it should be understood that this is primarily for the purpose of illustrating the principles of the invention, and that many modifications and changes can be made in the construction of the machine within the spirit and scope of the invention.

I claim:

1. Work-clamping mechanism including a work support, a pair of parallel links, a fixed support, a bell crank pivotally connected to said fixed support at one side of said work support, one end of one of said parallel links being pivotally connected on said fixed support coaxially with said bell crank, one end of the other parallel link being pivotally connected to one arm of said bell crank, a work-engaging head pivotally connected to the other ends of said parallel links, an operating arm pivotally mounted on said fixed support and having an articulated connection to one of said parallel links to swing said work-engaging head to and from said work support, and cooperating portions on said operating arm and said bell crank to tilt said bell crank toward and from said work support upon movement of said work-engaging head toward and from the work support, respectively.

2. The work clamping mechanism as defined in claim 1 wherein said cooperating portions include a cam slot and a pin therein, one in said operating arm and the other in said bell crank.

3. Work clamping mechanism including a frame, a pair of parallel links one of which is pivotally mounted at one end on said frame, means pivotally connected to one end of the other link and to said frame, a work-engaging head pivotally connected to said links, an operating arm pivotally mounted on said frame and having an articulated connection to one of said parallel links and providing for swinging of said operating arm in opposite directions into normal and work-clamping positions, respectively, to move said work-engaging head from and to work-engaging positions, respectively, the axis of the pivotal connection of the second-mentioned link to said means being in one common plane with the axis of the pivotal connection of the first mentioned link to said frame when said operating arm is swung into said work-clamping position and being movable out of said plane upon swinging of said operating arm into said normal position, said first mentioned means comprising a bell crank pivotally connected to said frame and said end of the first mentioned link being pivotally connected on said frame coaxially with the bell crank while said end of the second mentioned link is pivotally connected to one arm of the bell crank, and there being cooperating portions on said operating arm and the other arm of said bell crank to cause tilting of said bell crank for moving said pivotal connection of the second mentioned link with said bell crank into and out of said common plane with the pivotal connection of the first mentioned link to the frame upon swinging of said operating arm in opposite directions, respectively.

4. Work-clamping mechanism as defined in claim 3 wherein said articulated connection comprises a motion-transmitting link having one end pivotally connected to said operating arm and the other end pivotally connected to the first-mentioned link intermediate its ends, the arrangement of said pivotal connections providing for movement of the pivotal connection of the motion-transmitting link to the first mentioned link beyond the dead center line between the pivotal connections of said motion-transmitting link to said operating arm and said operating arm to said frame when said work-engaging head is moved to work-clamping position, thereby to lock the clamp in work-clamping position.

5. In work-clamping mechanism the combination with a work support, of a frame disposed at one side of said work support, a pair of parallel links one of which is pivotally mounted at one end on said frame, a bell crank pivotally connected to said frame at one side of said work support, said end of the first-mentioned link being pivotally connected on said frame coaxially with said bell crank, one end of the other parallel link being pivotally connected to one arm of said bell crank, a work-engaging head pivotally connected to the other ends of said links to clamp work between itself and said work-support, an operating arm pivotally mounted on said frame and having an articulated connection to the first mentioned link intermediate the ends of the latter providing for swinging of said operating arm in opposite directions to move said work-engaging head to and from work-clamping relation to said work support, respectively, the pivotal connections of said parallel links to said frame and to the bell crank, respectively, being disposed in a common plane approximately perpendicular to the plane of the work support when said work-engaging head is in work-clamping relation to the work support, and said operating arm and said bell crank means having cooperative portions for moving said pivotal connections into a common plane oblique to the plane of the work support when the work-engaging head is moved away from said work-clamping relation to the work support, said parallel links causing said work-engaging head to move in approximately a straight line during the latter part of the movement of said head into engagement with the work, and said parallel links normally being disposed approximately parallel to each other and approximately perpendicular to the plane of the work support so as to locate said work-engaging head in an out-of-the-way position during placement of work on the work support.

6. In the combination as defined in claim 5, said cooperative portions including a cam slot and a pin therein, one in said operating arm and the other in said bell crank.

References Cited in the file of this patent

UNITED STATES PATENTS

| | | |
|---|---|---|
| 1,476,669 | D'Ardenne | Dec. 4, 1923 |
| 1,997,428 | Olson | Apr. 5, 1935 |
| 2,350,034 | Herrington | May 30, 1944 |
| 2,436,941 | Sendoykas | Mar. 2, 1948 |